3,379,678
OLEFIN POLYMER COMPOSITIONS CONTAINING THIAZOLINE POLYSULFIDE STABILIZING MATERIALS
Carl C. Greco, Bronx, and Walter Stamm, Tarrytown, N.Y., assignors to Stauffer Chemical Company, New York, N.Y., a corporation of Delaware
No Drawing. Filed Nov. 25, 1966, Ser. No. 596,816
7 Claims. (Cl. 260—45.8)

ABSTRACT OF THE DISCLOSURE

The present invention is directed to polyolefin polymer compositions containing a stabilizing quantity of thiazoline polysulfide material as stabilizer therefor. The preferred stabilizing compound is thiazoline disulfide used in an amount of from above 0.01% to about 5.0% by weight based on the weight of the polymer.

---

The present invention relates to the stabilization of alpha-olefin polymer compositions from degradation due to oxidation influenced by ultraviolet light by the inclusion in the polymer composition of a thiazoline polysulfide stabilizing material.

Alpha-olefin polymeric materials such as polyethylene and polypropylene have attained considerable commerical importance due to their excellent physical mechanical and electrical properties. However, these materials are subject to deterioration from heat and sunlight both of which induce oxidation of the polymeric chain structure and thereby impair tensile strength, low temperature brittleness and dielectric properties.

In order to overcome the problem of light induced oxidation or degradation of the polymer, various ultraviolet light absorbers and antioxidants have been admixed with the polymer to retard the deteriorating effects of ultraviolet light in the final product. Ultraviolet light stabilization has been accomplished by the inclusion of carbon black particles in the polymer composition. In an attempt to provide both heat and light stability, other workers found that the combination of carbon black with R—S—S—R' such as benzothiazyl disulfide would provide both (see Hawkins et al. U.S. 2,967,850, issued Jan. 10, 1961). Hawkins et al., however, indicates that these R—S—S—R' materials are substantially ineffective in the absence of the carbon black to provide the desired stabilization effect.

It has been discovered that a certain class of thiazoline polysulfide compounds are surprisingly effective in preventing the oxidative degradation of polyolefins induced by ultraviolet radiation in the absence of other materials, such as carbon black.

In accordance with the present invention, polymer compositions of olefin polymeric materials are stabilized against oxidative degradation by inclusion in the polymer composition of a thiazoline polysulfide stabilizer of the formula:

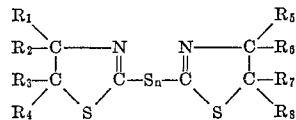

wherein $n$ is 2, 3 or 4, preferably 2, and in which the R groups can be hydrogen and/or lower alkyl radicals having from 1 to 10 carbon atoms. Preferably, at least one R group per carbon atom is hydrogen and, more preferably, all the R groups are hydrogen. Surprisingly, this group of materials shows markedly improved stabilizing characteristics over previously used materials such as benzothiazyl disulfide and can be used in the absence of any activating material. As an apparent explanation for the difference, the thiazole compound is of an aromatic nature in that the electron configuration for the unsaturated bonds is a pi electron system similar to benzene, whereas the thiazoline material is non-aromatic in that the unsaturation is a simple double bond system between the carbon and the nitrogen.

The stabilizing materials of the present invention are thiazoline polysulfides of the formula:

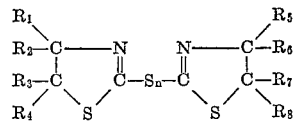

wherein $n$ is a number from 2 to 4, and the R groups are hydrogen or lower alkyl groups. Preferably, each carbon atom has at least one hydrogen atom since the effectiveness of the compounds as stabilizers tends to be reduced by the introduction of numerous alkyl substitutes per molecule, especially if two are attached to one carbon atom. More preferably, a majority of the R groups are hydrogen and most preferably all are hydrogen. The alkyl substituents can be illustrated by methyl, ethyl, propyl, butyl, isobutyl, isopropyl, and the like. Preferably, the alkyl group is methyl. The alkyl substituents on the molecule can be the same or different and can be attached to one or both ring structures. Preferably, the molecule is symmetrical, e.g., the same substituents on both rings in the corresponding positions. Illustrative of these compounds are the following:

2,2'-dithio bis(thiazoline)
2,2'-dithio bis(4-methyl thiazoline)
2,2'-dithio bis(5-methyl thiazoline)
2,2'-dithio 5' methyl bis(thiazoline)

These thiazoline disulfide stabilizers are easily prepared by conventional methods. A most convenient method is by oxidation of 2-mercaptothiazolines with oxidizing agents such as iodine, or peroxide such as hydrogen peroxide. (Elderfield-Heterocyclic Compounds (1957) vol. 5, p. 695). The mercaptothiazolines are easily prepared by known commercial methods such as reacting ethylenimine with carbon disulfide. (Industrial Organic Nitrogen Compounds, Astle ACS Monograph Series No. 150, p. 119 (1961).

The thiazoline trisulfides are easily prepared by forming the sodium salt of 2-mercaptothiazolines with sodium hydroxide and reacting the sodium salt with sulfur dichloride ($SCl_2$). In a similar manner, the thiazoline tetrasulfides can be formed by using sulfur monochloride ($S_2Cl_2$) in place of the sulfur dichloride.

The thiazoline polysulfide compounds as described herein are suitable for stabilizing a wide variety of solid poly-α-olefin hydrocarbon polymer compositions against deterioration resulting from exposure to actinic radiation. These polymers are any of the normally solid homopolymers and copolymers derived from the polymerization of α-monoolefinic aliphatic hydrocarbons containing from two to ten carbon atoms but more particularly those containing a predominant amount of polymerized olefin monomers containing 2–3 carbon atoms. Typical poly-α-olefin homopolymers include polyethylene, polypropylene, poly(3-methylbutene-1), poly(4-methylpentene-1), poly (pentene - 1), poly(3,3 - dimethylbutene-1), poly(4,4-dimethylbutene-1), poly(octene-1), poly(decene-1), and the like. Within the term polymer is also included copolymers and interpolymers such as, terpolymers, derived from the α-monoolefinic hydrocarbons containing from two to ten carbon atoms forming the illustrated polymers in combination with other α monoolefinic and/or diolefinic and cyclodiolefinic hydrocarbon materials. The diolefinic materials are illustrated by butadiene and the like, and the cyclodiolefinic materials by cyclopentadiene and the like. Illustrative of the copolymers and terpolymers are ethylene - propylene copolymers, ethylene - propylene - butene-1 terpolymers, ethylene-propylene-butadiene terpolymers, ethylene-propylene-hexene terpolymers, and the like. The terms hydrocarbon polymer hydrocarbon polymeric material and olefin or olefinic hydrocarbon material are used in this strict sense to denote material containing only carbon and hydrogen atoms.

It has been ascertained that the thiazoline polysulfide stabilizer compounds of the invention are particularly useful for preventing photo-degradation by ultraviolet light or sunlight of the highly crystalline polyolefins such as isotactic polypropylene. Isotactic polypropylene is a stereo-regular polymer wrerein the monomeric units are linked predominantly end-to-end rather than the more common arrangement consisting of a distribution of linear and cross-linked units. Moreover, the substituents attached to the chain are systematically disposed in a configuration which tends to promote an orderly and close alignment of the molecules. Such stereo-regular polymers exhibit a high degree of crystallinity and are much superior in physical properties to amorphous polymers having a random distribution of monomeric units. For a fuller description of crystalline polymers, reference is made to the Scientific American, 197 No. 3, pp. 98–104 (1957); 205 No. 2, pp. 33–41 (1961).

Although the molecular weight of poly-$\alpha$-olefin polymers varies over wide limits, the stabilizer compounds of the present invention are not limited to use in any particular molecular weight range of polymer. Poly-$\alpha$-olefin polymers ranging in molecular weight from about 10,000 to about 100,000 and preferably from 10,000 to 20,000 can be stabilized by use of the stabilizer compounds of the present invention. Also, the so-called poly-$\alpha$-olefin waxes having a molecular weight in the range of about 2,000 to about 10,000 are likewise susceptible to stabilization by means of the compounds of the invention. The polymers within the molecular weight ranges given above carry in physical properties such as softness and hardness depending on the densities and crystallinities of the polymers induced by branching of the polymer chain in combination with the molecular weight. Thus, linear high density materials, such as linear polyethylene, tends to be harder than a branched or low density material, such as low density polyethylene, of the same molecular weight. The stabilizer materials of the present invention work with equal effectiveness in both materials. The accommodation of varying physical properties of the hydrocarbon polymer requires only an adjustment in the method of incorporation of the stabilizer therein. As with the polymers, the so-called waxes also vary from soft to brittle depending on crystallinity and the incorporation of the stabilizers therein is accommodated by adjustment of the incorporation method.

The poly-$\alpha$-olefin compositions stabilized in accordance with the invention exhibit an extended life expectancy and are much more useful and practical than unstabilized poly-$\alpha$-olefins and moreover possess a wide diversity of uses including out-of-door installations under prolonged exposure to sunlight and the elements. The poly-$\alpha$-olefins stabilized as contemplated herein can be cast, extruded, rolled or molded into sheets, rods, tubes, piping, filaments and other shaped articles, including sheets or films ranging from 0.5 to 100 mils in thickness. The polymer compositions of the invention can be applied as coating to paper, cloth, wire, metal foil and are suitable for the manufacture of synthetic fibers and fabrics.

The thiazoline polysulfide compound is incorporated in the hydrocarbon polymer in sufficient quantity to have a stabilizing effect on the polymer, e.g., a stabilizing quantity. Although the quantity of stabilizer is not particularly critical, it is recommended that the concentration based on the weight of the polymer be maintained in the range of 0.01% to about 5.0% by weight.

In practicing the invention the thiazoline polysulfide stabilizer compounds can be blended or incorporated into the poly-$\alpha$-olefin compositions by any of the conventional methods commonly used for mixing such materials with thermoplastic polymers. The incorporation technique should be such that a substantially homogeneous blend or intimate admixture of the stabilizer compounds in the polymer is obtained so that the stabilizing effect is afforded all portions of the polymer compositions. The method of incorporation of the stabilizer in the polymer can vary slightly depending on the physical nature of the hydrocarbon polymer and such variations are easily accomplished by well known techniques. A typical procedure comprises melt blending by milling on heated rolls, although deposition from solvents and dry blending are other well known techniques.

The stabilizers may also be added to liquid polymer compositions in the same fashion by using kneading or milling techniques as is well known. A slurry of the stabilizer in a small quantity of diluted polymer can be made to facilitate its addition to the liquid polymer compositions.

Other additives may be included in the polymer composition such as pigments, dyes, fillers, curing accelerators, or curing agents and the like as is well known in the polymer field. The stabilizing effect is not diminished by the addition of these materials.

These stabilizers have particular utility in the preparation of clear plastic or polymer articles whose clarity is not effected by the presence of the stabilizer in the composition.

The invention is illustrated in the examples which follow. In these examples and throughout this specification, all parts and percentages are by weight based on the weight of the polymer used unless otherwise specified.

Example 1

In a 500 milliliter flask, equipped with stirrer, thermometer, dropping funnel, and reflux condenser was dissolved 50 grams of 2-mercaptothiazoline and 0.5 milliliter of concentrated hydrochloric acid in 300 milliliters of methanol. To this admixture was added, dropwise, 53 milliliters of a 30% aqueous hydrogen peroxide solution (16 grams of $H_2O_2$ in water). The temperature rose to 56° C. upon addition of the peroxide, after which the reaction mixture was refluxed for three hours. The crude product was filtered from the reaction mixture and washed several times with methanol and benzene to remove unreacted starting materials. The product was an insoluble, colorless solid weighing 31 grams (yield 62%) and had a melting point of 120° C. Elemental analysis and spectra confirmed the proposed structure as 2,2'-dithio bis(thiazoline).

Example 2

A dry blend consisting of 0.5% of the stabilizer of Example 1 and 50 grams of isotactic polypropylene was subjected to compression molding in the usual manner at a temperature of 400° F. for six minutes at 2000 p.s.i. to form a 25 millimeter sheet which was thereafter cut into square samples measuring 2 inches. The sample was then exposed in a Xenon Arc Weatherometer operating at 6000 watts. The temperature within the Weatherometer was 140° C. The water cycle was adjusted whereby the sample was subjected to 18 minutes of water spray for each two hours of dry exposure. Exposure damage to the sample of polypropylene was assessed with respect to change of structural strength. The results of the test established that the 2,2'-dithio bis(thiazoline) protected the polypropylene for 1,637 hours before embrittlement had set in.

The exposure is reported as the number of hours in the Weatherometer which produces structural failure of the sample which for the purposes of these tests refers to the degree of brittleness which causes the samples to break when flexed through 180°. The flex test is conducted every two days on the sample up to three weeks and then twice a week up to ten weeks. The number of hours reported indicates the time a sample is subjected to the Xenon Arc prior to breakage induced by the flex test.

The Weatherometer as used in compiling the data and tests described herein was purchased from the Atlas Electric Devices Company, Chicago, Ill. The instrument is identified as a 6000 watt Xenon Arc Weatherometer Model 60 W.

Example 3

The procedure given in Example 2 was repeated but in this instance the stabilizer was benzothiazyl disulfide, e.g., 2,2-dithio bis(benzothiazole). Embrittlement of the test sample occurred after an exposure of only 160 hours.

The polypropylene resin as used in the above described examples is an unstabilized general purpose, high molecular weight polypropylene of the isotactic or crystalline type. Typically it has a melt index of 4 at 230° C. and a specific gravity of 0.905. The resin is supplied in the form of natural flakes.

The pure polypropylene resin degrades in the Weatherometer within 40 hours and within 400 hours in the presence of an antioxidant material such as 4,4′-dithio bis-[2,6-bis(α-methyl benzyl)phenol] and the like. Degradation time of the polypropylene in the presence of known stabilizer materials, such as 2-hydroxy-4-octyl benzophenone and the like, range from 1000–1500 hours in the Weatherometer.

It is clear from the comparison of the results obtained from Example 2 and the results obtained from Example 3 that the stabilizers of the present invention showed unexpected superiority over the stabilizers, such as benzothiazyl disulfide, presently known to the art. This superiority is obtained in the absence of any additional material within the plastic or polymer composition and allows for the preparation of stabilized, clear plastic articles which have reduced susceptibility to degradation or oxidation induced by sunlight and ultraviolet light. With regard to the thiazoline disulfide compounds of the present invention, there is shown a tenfold increase in the stabilization of the polymer material which is remarkable and unexpected and particularly advantageous in the preparation of clear plastic articles from plastic materials, such as polyethylene and polypropylene.

The invention is defined in the claims which follow.

What is claimed is:

1. A polymer composition which is stabilized against oxidation and light degradation comprising, in admixture, a hydrocarbon polymer formed from alpha olefins having from 2 to 10 carbon atoms; and as a stabilizer therefor, a stabilizing quantity of a thiazoline stabilizer compound of the formula:

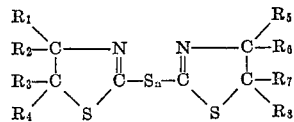

wherein $n$ is a numeral from 2 to 4, $R_1$, $R_2$, $R_3$, $R_4$, $R_5$, $R_6$, $R_7$, and $R_8$ are members of the group consisting of hydrogen and lower alkyl radicals having from 1 to 10 carbon atoms.

2. A polymer composition as recited in claim 1 wherein $n$ is 2.

3. A polymer composition as recited in claim 1 in which such hydrocarbon polymer is polyethylene.

4. A polymer composition as recited in claim 1 in which such hydrocarbon polymer is polypropylene.

5. A polymer composition as recited in claim 1 wherein from 0.01% to 5.0% by weight based on the weight of the polymer of said stabilizer compound is used.

6. A polymer composition as recited in claim 1 wherein $R_1$, $R_3$, $R_5$ and $R_7$ are hydrogen.

7. A polymer composition as recited in claim 1 wherein said stabilizer compound is 2,2′-dithio bis(thiazoline).

References Cited

UNITED STATES PATENTS 3,269,980  8/1966  Heuck et al. _____ 260—45.8 XR
3,288,798  11/1966  Spirack et al. ____ 260—45.8 XR

FOREIGN PATENTS 1,131,879  6/1962  Germany.

JAMES A. SEIDLECK, *Primary Examiner.*

M. J. WELSH, *Assistant Examiner.*